Aug. 30, 1932. H. C. HAAG 1,874,510
WINDSHIELD DEFROSTER
Filed March 18, 1930   3 Sheets-Sheet 1
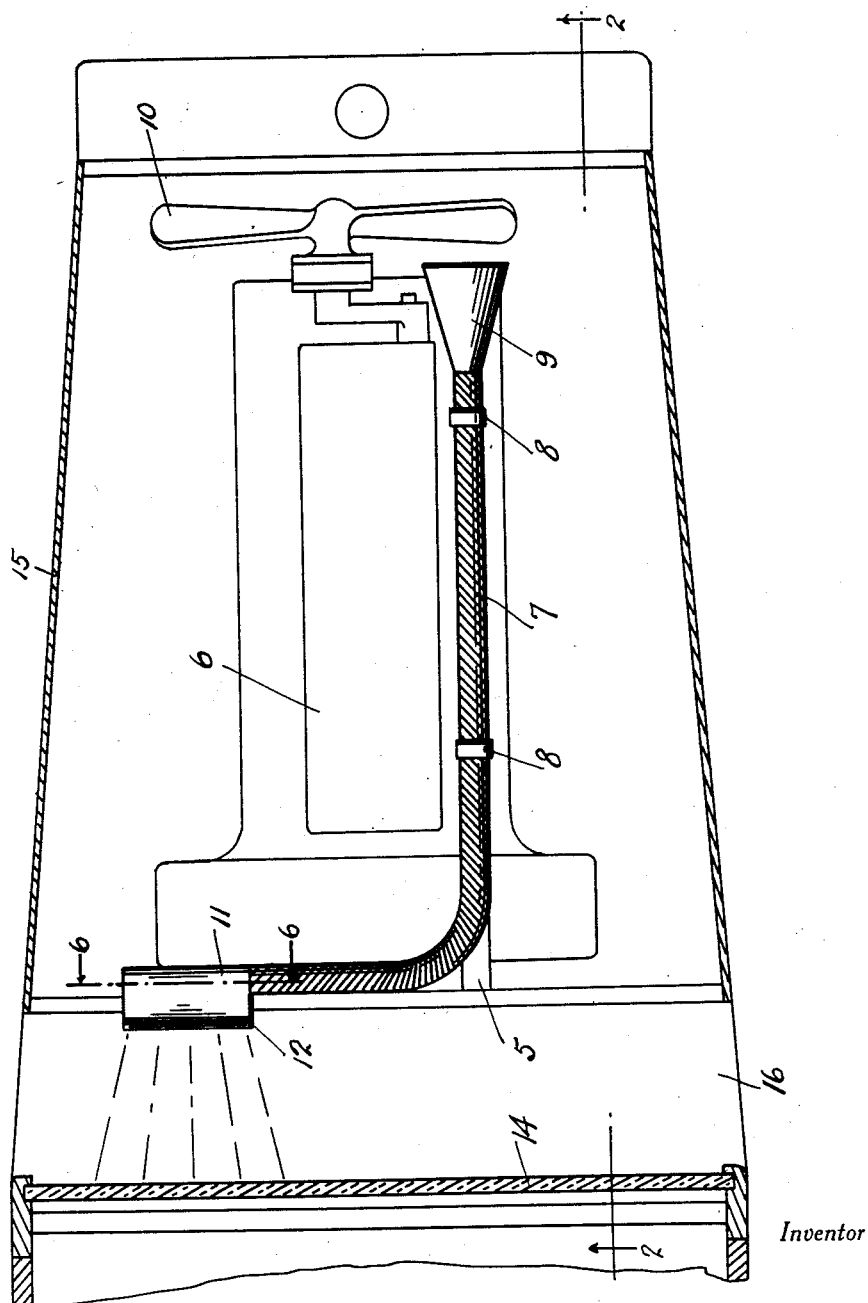
Inventor
H. C. Haag
By Clarence A. O'Brien
Attorney

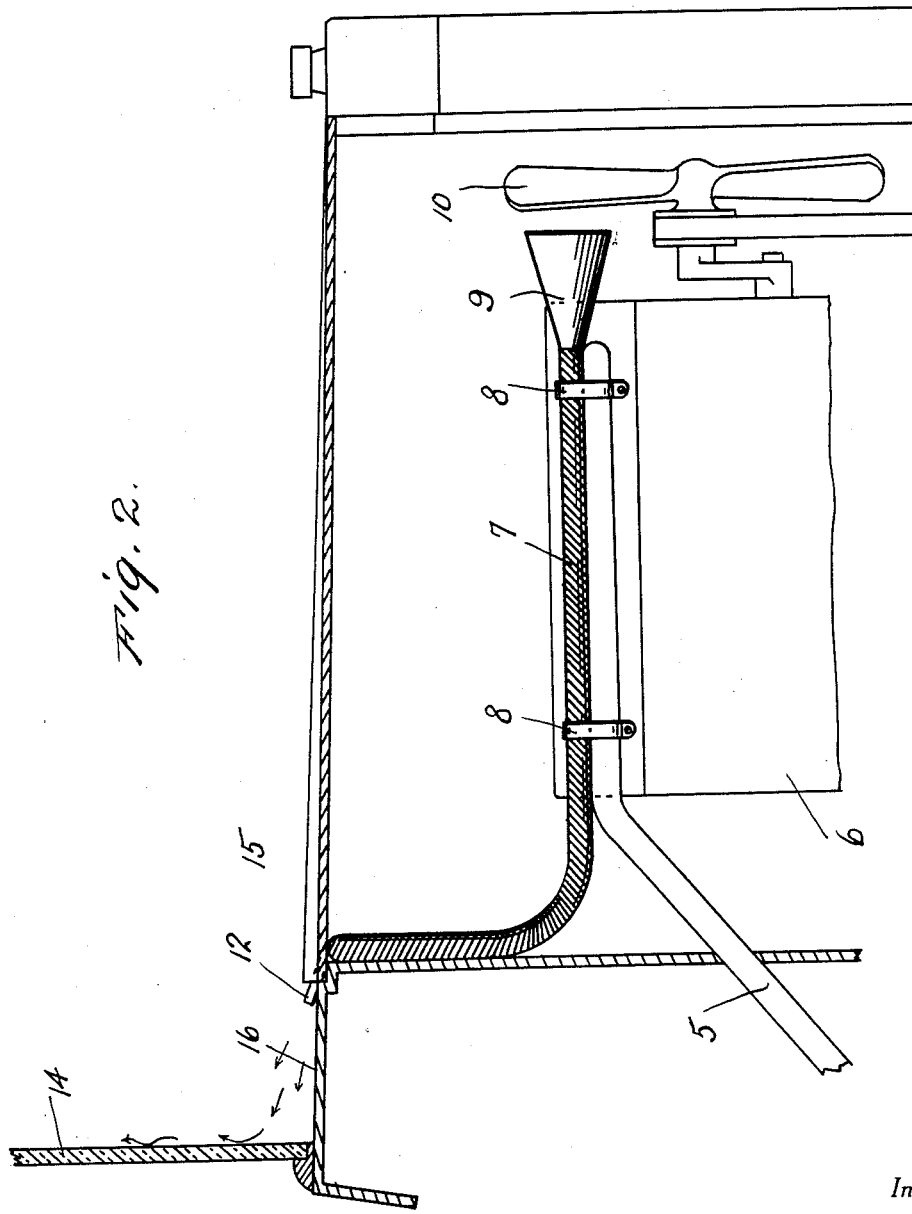

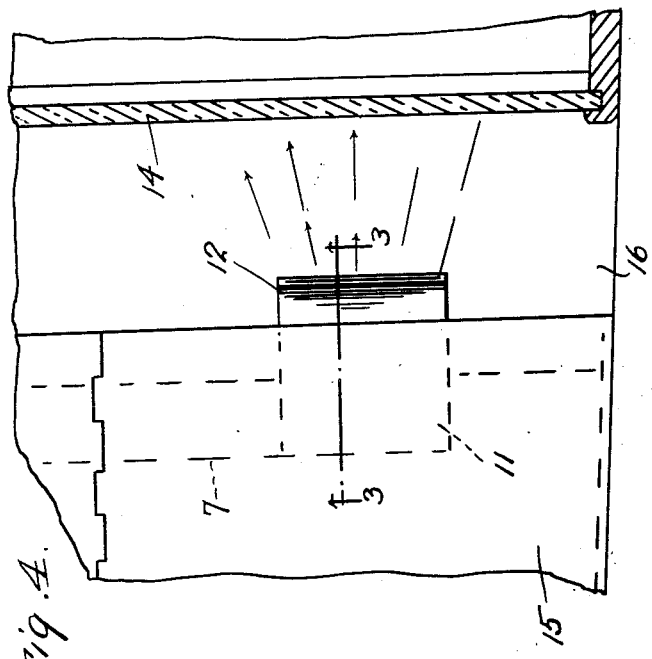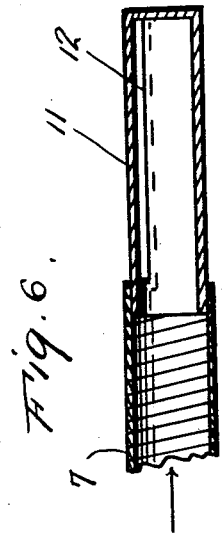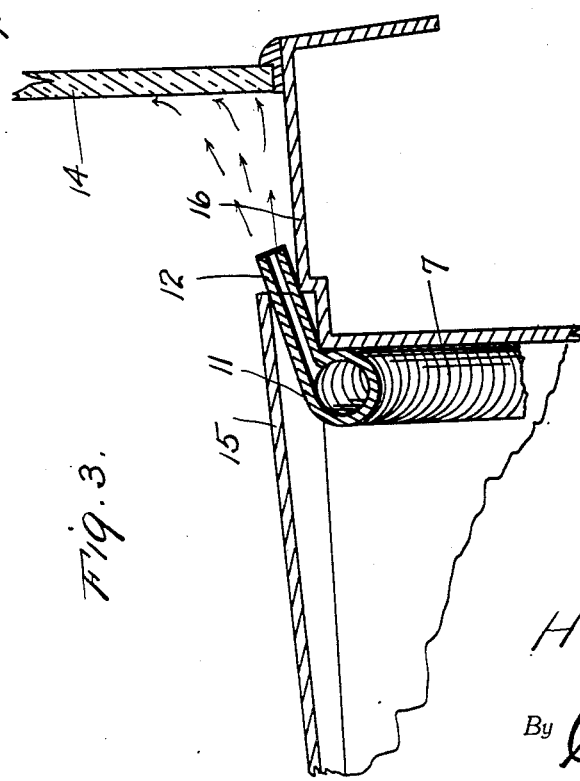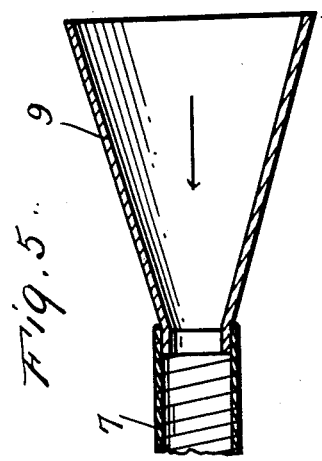

Patented Aug. 30, 1932

1,874,510

UNITED STATES PATENT OFFICE

HAROLD C. HAAG, OF LARNED, KANSAS

WINDSHIELD DEFROSTER

Application filed March 18, 1930. Serial No. 436,771.

The present invention relates to an apparatus for defrosting windshields of automobiles in cold weather consisting in neat and compact means whereby a current of heated air may be directed on to the windshield particularly in front of the driver thereby preventing frost forming on the windshield during cold bad weather and this without detracting from the finished appearance of the automobile.

Another very important object of the invention resides in the provision of an apparatus of this nature which is exceedingly simple in its construction, inexpensive to manufacture, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a sectional view through an automobile showing my improved apparatus in top plan view, Figure 2 is a vertical longitudinal section therethrough taken substantially on the line 2—2 of Figure 1, Figure 3 is a vertical detail section taken substantially on the line 3—3 of Figure 1, Figure 4 is a top plan view of the cowl portion of the automobile showing the nozzle in top plan, Figure 5 is a detail longitudinal section through the funnel, and Figure 6 is a sectional view taken substantially on the line 6—6 of Figure 1.

Referring to the drawings in detail it will be seen that the numeral 5 denotes the exhaust manifold of an internal combustion engine 6 in an automobile. The numeral 7 denotes a flexible tube which is clamped along a portion of the manifold 5 by suitable means 8. At the front end of the tube there is mounted a forwardly directed outwardly flaring funnel 9 terminating to the rear of the fan 10.

The rear end of the tube 11 is curved upwardly and has fixed thereon an oblong hollow body 11 with an upwardly and rearwardly inclined nozzle 12 directed toward the lower portion of the windshield 14, said nozzle being extended under the hood 15 and over the cowl 16. It will therefore be seen that as the automobile is in motion a current of air will pass into the funnel 9 being assisted by the fan 10 and will be forced through the tube 7 and heated by the exhaust manifold 5 and exhausted out through the nozzle 12 on to the windshield 14 so as to sufficiently heat the same to prevent frost, ice and the like forming thereon.

It will be noted that this nozzle is located preferably in front of the driver. The apparatus is exceedingly simple in its construction, easy to install, capable of installation on practically all makes of automobiles, and thoroughly efficient and reliable in use.

The present embodiment of the invention, however, has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In an automobile, the combination with a windshield, an engine having an exhaust manifold, a fan, a cowl, a hood having a rearwardly directed opening in its portion immediately above the cowl and adjacent to the left hand side of the automobile, and a tube having a forward portion disposed in rear of the fan, said tube arranged entirely below the hood and hidden from view by the same, of a tubular body arranged transversely under the hood at one side of said opening and connected at one end to said tube and closed at its end remote from the tube and having a thin elongated nozzle extending upwardly and rearwardly through said opening in the hood and spaced from and parallel to the windshield to discharge heated air on the forward side of the windshield.

In testimony whereof I affix my signature.

HAROLD C. HAAG.